Sept. 10, 1968  I. J. ALLEN  3,400,785
ENGINE LUBRICATION SYSTEM

Filed Sept. 26, 1966  2 Sheets-Sheet 1

INVENTOR
IVIS J. ALLEN
BY
John R. Faulkner
E. Dennis O'Connor
ATTORNEYS

Sept. 10, 1968      I. J. ALLEN      3,400,785
ENGINE LUBRICATION SYSTEM
Filed Sept. 26, 1966      2 Sheets-Sheet 2
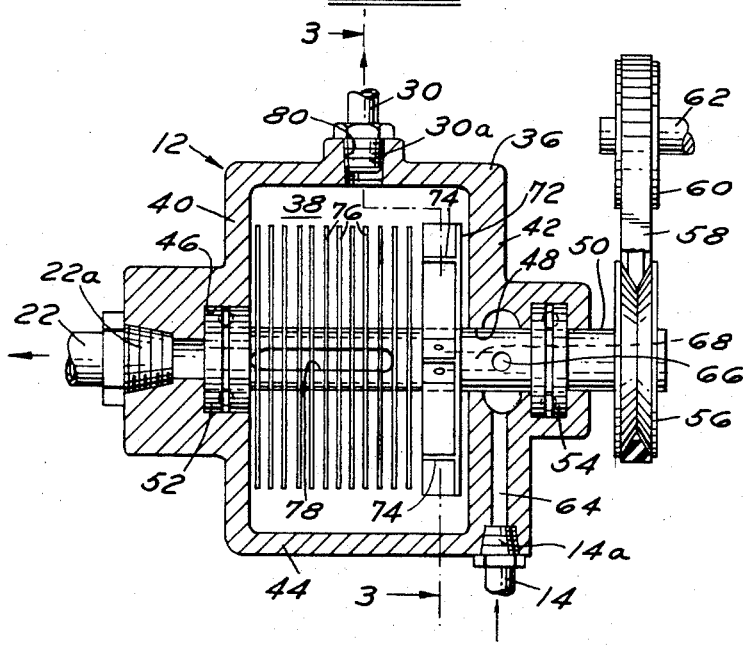
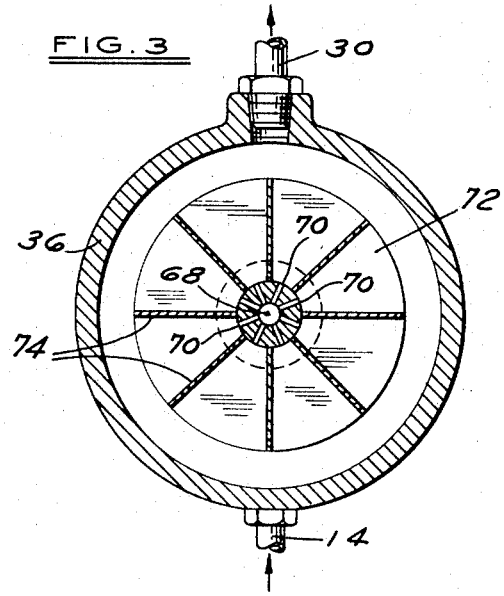
INVENTOR
IVIS J. ALLEN
BY
John R. Faulkner
E. Dennis O'Connor
ATTORNEYS

United States Patent Office 3,400,785
Patented Sept. 10, 1968

3,400,785
ENGINE LUBRICATION SYSTEM
Ivis J. Allen, Ann Arbor, Mich., assignor to Ford Motor Company, Dearborn, Mich., a corporation of Delaware
Filed Sept. 26, 1966, Ser. No. 581,847
3 Claims. (Cl. 184—6)

This invention relates to a lubrication system for an internal combustion system, and in particular to a lubrication system including a centrifugal, non-replaceable oil filter.

It is well-known that in internal combustion engines having a fluid circuit for the passage of lubricant, dirt particles, impurities and contaminants become present in the lubricant and have a deleterious effect on the wear and performance characteristics of the engine. Due to the accumulation of such foreign matter in the lubricant, engine lubricant must be removed periodically in its entirety and replaced with clean lubricant. It is conventional that a lubricant filter be present in the lubricant circuit to remove a portion of this foreign matter and thus prolong the effective life of the lubricant.

Conventional internal combustion engines utilize a replaceable lubricant filter consisting of some type of filtering grid that allows passage of the lubricant and impedes the passage of foreign matter particles. Filters of this type must be replaced periodically as they collect an accumulation of foreign matter known as sludge. Such a replacement of filters occasions expense and the annoying consumption of time for the motor vehicle operator. Also, it is commonplace that motor vehicle owners and operators neglect the replacement of lubricant oil filters and thus contribute to an impairment of engine operating efficiency.

The prior art details attempts to alleviate these problems by providing lubricant filtering means consisting of centrifugal separators that remove dirt, contaminants and impurities from engine lubricant and are permanent rather than replaceable equipment. However, such arrangements provide that the foreign matter removed from the lubricant is collected in a sludge trap that periodically must be cleaned.

It is, therefore, the purpose of this invention to provide a lubrication system for an internal combustion engine that utilizes a centrifugal, non-replaceable oil filter that does not require cleaning or other maintenance on a periodic basis.

A further object of this invention is to provide a lubrication system for an internal combustion engine wherein foreign matter is denied access to the engine and is returned to the lubricant sump.

A lubrication system constructed in accordance with this invention is utilized with an internal combustion engine having a lubricant entrance and lubricant exit means communicating with a lubricant sump. The system includes a centrifugal filter, first conduit means communicating between said sump and said filter, second conduit means communicating between said filter and said input means and third conduit means communicating between said filter and said sump. Pressure developing means are connected with said first conduit means for forcing lubricant under pressure from said sump to said filter. A pressure relief bypass valve is operatively connected to said third conduit means to regulate the lubricant pressure in the engine. The centrifugal filter comprises a housing defining a filtering chamber. The housing includes two opposed end walls and a side wall. Each of said end walls have an aperture formed therethrough, and a third aperture is formed through said side wall. One of said end wall apertures communicates with said first conduit means and the other of said end wall apertures communi- cates with said second conduit means. The side wall aperture communicates with the third conduit means. A rotatable shaft is journaled in the end walls of the filter housing and is operatively connected to the engine for rotation. Impeller means are rotatably mounted on the shaft proximate to said one end wall aperture and a plurality of spaced filtering means cause a plurality of laminar lubricant layers to be formed between said spaced filtering means. As the shaft rotates and spins the filtering means, certain of these laminar layers spin at different velocities, thus preventing the entrance of foreign particles between the spaced filtering means.

Additional objects and advantages of this invention will become apparent when the following description is considered in conjunction with the accompanying drawings wherein like reference numerals designate like parts throughout the several figures and where:

FIGURE 2 is an elevation view, partially in section, of the centrifugal filter used in the lubrication system of FIGURE 1;

FIGURE 3 is a sectional view taken along the line 3—3 of FIGURE 2; and

Figure 1:
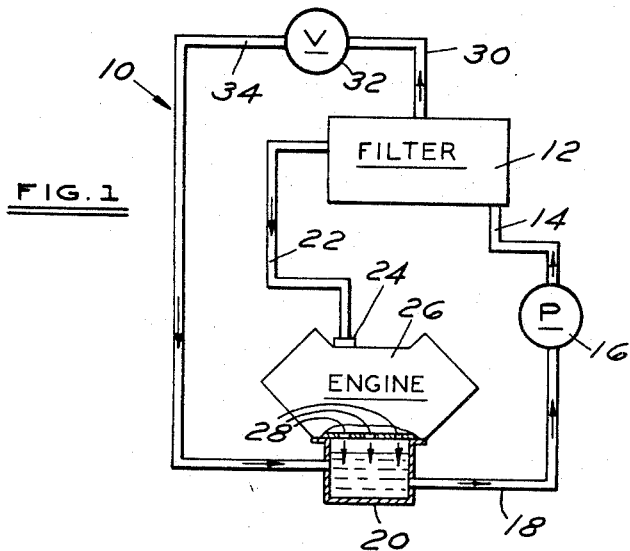
FIGURE 1 is a schematic representation of an engine lubrication system constructed in accordance with this invention.

Referring now in detail to the drawings and in particular to FIGURE 1, the numeral 10 denotes a schematic representation of the internal combustion engine lubricating system constructed in accordance with this invention. A centrifugal lubricant filter 12 is connected by means of a conduit 14 to a pump 16, which in turn is connected by a conduit 18 to the crankcase or sump 20. A conduit 22 interconnects filter 12 with a lubricant input fitting 24 of an internal combustion engine 26. Engine 26 is positioned, in the conventional manner, so that lubricant, after performing its lubricating function within engine 26, may drain into sump 20 by means of drains 28. A bypass conduit 30 interconnects filter 12 with a variable pressure bypass valve 32. Valve 32 is in turn connected by means of a conduit 34 with sump 20.

Apparatus constructed as shown in FIGURE 1 allows lubricant from sump 20 to be pumped through conduits 18 and 14 into filter 12. The volume of lubricant so pumped into filter 12 exceeds the volume of lubricant necessary to perform the lubrication required by engine 26. As will be explained in detail below, the lubricant from sump 20, upon its entrance into filter 12, is filtered so that foreign matter is removed and physically separated from the lubricant that exits filter 12 by conduit 22. This filtered lubricant, absent foreign matter exits from filter 12 via conduit 22 and enters engine 26 through input fitting 24 wherein it performs the necessary lubrication of engine 26 and then drains through drains 28 to sump 20.

The pressure setting of relief valve 32 corresponds to the desired lubricant pressure required in engine 26. It may thus be seen that excess oil not needed to fulfill the lubrication requirements of engine 26 exits filter 12 through conduit 30 and proceeds through valve 32 and conduit 34 to sump 20. The lubricant passing through conduits 30 and 34 and valve 32 carries with it the foreign matter that has been separated from the lubricant that has passed through conduit 22 to engine 26. The arrows shown in FIGURE 1 represent flow of lubricant through the lubrication system.

Lubricant filter 12 is shown in detail in FIGURES 2 and 3 and comprises a casing 36 that defines a filtering chamber 38. Casing 36 comprises opposed end walls 40 and 42 and an arcuate side wall 44. Apertures 46 and 48 are formed through end walls 40 and 42 respectively. A shaft 50 extends through aperture 48 and chamber 38 and into aperture 46 and is rotatably journaled in bearings 52 and 54.

Shaft 50 is rotated by means of a power take-off from engine 26. A suitable power take-off arrangement is illustrated and comprises a pulley 56 mounted for unitary rotation with shaft 50, a belt 58, and a pulley 60 mounted for unitary rotation with engine crankshaft 62. It is to be understood that it need not be the engine crankshaft, as illustrated, that provides the motivation for the rotation of shaft 50. For instance, a power take-off could be associated with the engine camshaft of distributor shaft in order to provide motivation for the rotation of shaft 50. Also, it is not necessary that shaft 50 be rotated at engine speed, although rotation at this speed has proved satisfactory for the operation of filter 12.

Lubricant from sump 20 enters filter 12 by means of conduit 14 that is attached to casing 36 by means of a threaded end fitting 14a. The lubricant flows through a passageway 64 formed in end wall 42 and through a radial passageway 66 formed in shaft 50 to a central bore 68 formed along the longitudinal axis of shaft 50. The lubricant then flows through radial passageways 70, formed in shaft 50 and into chamber 38.

Lubricant emerging from radial passageways 70 into chamber 38 is forced outwardly against side wall 44 by blades 74 of an impeller 72 that is mounted on shaft 50 for unitary rotation therewith.

As explained above, pump 16 supplys a greater volume of oil to filter 12 then is needed to lubricate engine 26. Bypass valve 32 is set at the pressure desired for the lubricant present in engine 26. Thus, the lubricant pressure in chamber 38 exceeds the pressure setting of valve 32. This arrangement allows a first portion of the lubricant that enters chamber 38 to flow between the filtering discs 76 that are mounted for rotation with shaft 50 and into a groove 78 formed along shaft 50. Groove 78 communicates with aperture 46 so that this lubricant then flows into conduit 22 that is attached to casing 36 by means of a threaded conduit end fitting 22a.

The other portion of the lubricant present in chamber 38 exits filter 12 by means of an aperture 80 formed in side wall 44 and enters conduit 30 attached to side wall 44 by a threaded conduit end fitting 30a. This lubricant flows through valve 32, conduit 34 and returns to sump 20. As will be explained below in reference to FIGURE 4, the lubricant that exits chamber 38 via aperture 80 and conduit 30 carries with it foreign matter that has been separated from the lubricant that flows between discs 76.

As the lubricant enters chamber 38 and is thrown by impeller blades 74 against side wall 44, centrifugal force tends to collect the heavier particles of foreign matter against side wall 44. A large proportion of these particles are thus carried away directly by the lubricant that flows through aperture 80 and into conduit 30. Particles that attempt to enter the spaces between filter discs 76 are rejected and cannot enter these spaces. The exact physical phenomenon accounting for this rejection of particles from the spaces between spinning discs 76 is not completely understood. However, it is known that the lubricant passing between spinning discs 76 is spinning with discs 76 at a speed that is directly proportional to the distance of the lubricant from the discs 76. This condition may be envisioned as a plurality of laminar layers of lubricant present between the discs 76 and spinning at different speeds. These laminar layers of lubricant are illustrated schematically in FIGURE 4 wherein the lubricant flowing between discs 76 comprises laminar layers 82, 84, 86 and 88. The layers designated 82 are spinning at the same speed while the layers 84 are spinning at the same speed but somewhat slower than the layers 82. The layers 86 are spinning at the same speed but somewhat slower than the layer 84, while the layer 88 spins at a speed slower then the layers 86.

Figure 4:
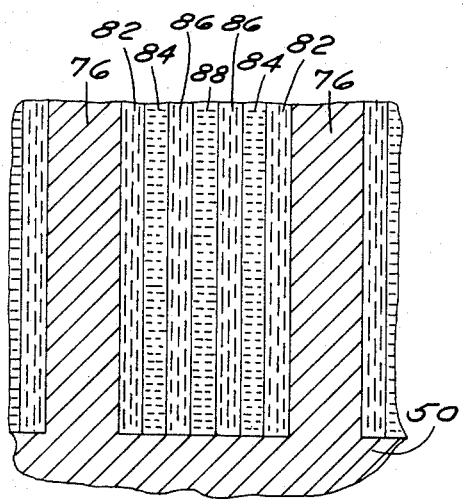
FIGURE 4 is a schematic representation of the laminar lubricant layers of lubricant formed between the spaced filtering means of the centrifugal filter.

It is to be understood that the representation shown in FIGURE 4 is schematic of the condition of the lubricant present between spinning discs 76. In reality, there are an infinite number of laminar layers present, each having a thickness measured in lubricant molecules. It is believed that the particles of foreign matter attempting to enter the space between discs 76 are caught in the spinning layers of lubricant and, because of their weight, are rejected and must exit from chamber 38 by means of aperture 80.

It may thus be seen that the lubricant passing between discs 76 and exiting filter 12 via conduit 22 is free from foreign matter and may be safely introduced into engine 26 to perform the requisite lubrication function. The lubricant exiting filter 12 by means of conduit 30 and containing the contaminants and impurities is returned to the sump 20. Thus, filter 12 as well as being a non-replaceable unit in the lubrication system, requires no periodic maintenance to remove accumulations of foreign matter that have been separated from the lubricant passing therethrough.

It is to be understood that this invention is not limited to the exact construction described above, but that various changes and modifications may be made without departing from the spirit and scope of the invention as defined by the following claims.

What is claimed is:

1. A lubrication system for an internal combustion engine having lubricant input means and lubricant exit means communicating with a lubricant sump, the system including a centrifugal filter, first conduit means communicating between said sump and said filter, pressure developing means operatively connected with said first conduit means for forcing lubricant under pressure from said sump to said filter, second conduit means communicating between said filter and said engine lubricant input means, third conduit means communicating between said filter and said sump, a pressure relief bypass valve operatively connected with said third conduit means, said filter comprising a housing defining a filtering chamber and having two opposed end walls and a side wall, said housing having an aperture formed through each of said end walls and an aperture formed in said side wall, one of said end wall apertures communicating with said first conduit means, the other of said end wall apertures communicating with said second conduit means, said side wall aperture communicating with said third conduit means, a rotatable shaft journaled in said end walls and extending through said chamber, means operatively connected to said engine for rotating said shaft, impeller means rotatably mounted on said shaft proximate said one end wall aperture, and a plurality of spaced filtering means rotatably mounted on said shaft causing a plurality of laminar lubricant layers to be formed between said spaced filtering means, various of said laminar layers moving at different velocities when measured at points equidistant from said shaft.

2. A lubrication system for an internal combustion engine having lubricant input means and lubricant exit means communicating with a lubricant sump, the system including a centrifugal filter, first conduit means communicating between said sump and said filter, pressure developing means operatively connected with said first conduit means for forcing lubricant under pressure from said sump to said filter, second conduit means communicating between said filter and said engine lubricant input means, third conduit means communicating between said filter and said sump, a pressure relief bypass valve operatively connected with said third conduit means, said filter comprising a housing defining a filtering chamber and having two opposed end walls and a side wall, said housing having an aperture formed through each of said end walls and an aperture formed in said side wall, one of said end wall apertures communicating with said first conduit means, the other of said end wall apertures communicating with said second conduit means, said side wall aperture communicating with said third conduit means, a rotatable shaft journaled in said end walls and extending through said chamber, means operatively connected to said engine for rotating said shaft, impeller means rotatably mounted on said shaft proximate said one end wall aperture, and a plurality of spaced filtering discs rotatably mounted on said shaft and normal to the axis of said shaft.

3. Apparatus according to claim 2, wherein said shaft has a groove formed therein communicating with said other end wall aperture.

References Cited

UNITED STATES PATENTS

| | | | |
|---|---|---|---|
| 1,596,534 | 8/1926 | Hendrickson | 123—196 |
| 2,072,180 | 3/1937 | Paton | 184—6 |
| 2,613,498 | 10/1952 | Prendergast | 184—6 X |
| 2,741,333 | 4/1956 | Dega et al. | 184—6 |
| 2,808,201 | 10/1957 | Mayeux | 233—28 |
| 2,878,995 | 3/1959 | Dega | 233—27 |
| 2,908,352 | 10/1959 | Giacosa | 233—28 X |
| 2,917,230 | 12/1959 | Kaldewey | 233—28 X |
| 2,984,410 | 5/1961 | Giacosa | 233—32 |
| 2,997,230 | 8/1961 | Bouvy | 233—32 |
| 3,014,643 | 12/1961 | Giacosa | 184—6 X |
| 3,022,937 | 2/1962 | Dega | 233—28 |
| 3,027,390 | 3/1962 | Thurman | 233—32 X |
| 3,185,390 | 5/1965 | Giacosa | 184—6 X |
| 3,342,408 | 9/1967 | Bergstrom | 233—28 X |

FOREIGN PATENTS 1,224,632  2/1960  France.

HOUSTON S. BELL, JR., *Primary Examiner.*